United States Patent
Caruk et al.

(10) Patent No.: US 11,151,075 B2
(45) Date of Patent: Oct. 19, 2021

(54) DATA COMMUNICATIONS WITH ENHANCED SPEED MODE

(71) Applicants: ATI Technologies ULC, Markham (CA); Advanced Micro Devices, Inc., Santa Clara, CA (US)

(72) Inventors: Gordon Caruk, Brampton (CA); Gerald R. Talbot, Concord, MA (US)

(73) Assignees: ATI Technologies ULC, Markham (CA); Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/221,181

(22) Filed: Dec. 14, 2018

(65) Prior Publication Data
US 2020/0192852 A1    Jun. 18, 2020

(51) Int. Cl.
*G06F 13/42* (2006.01)
*G06F 13/12* (2006.01)
*G06F 13/40* (2006.01)

(52) U.S. Cl.
CPC ........ *G06F 13/4282* (2013.01); *G06F 13/126* (2013.01); *G06F 13/404* (2013.01); *G06F 13/4045* (2013.01)

(58) Field of Classification Search
CPC .. G06F 13/4282; G06F 13/126; G06F 13/404; G06F 13/4045
See application file for complete search history.

(56) References Cited

U.S. PATENT DOCUMENTS

| | | | | |
|---|---|---|---|---|
| 7,426,597 B1 * | 9/2008 | Tsu | ................... | G06F 13/4018 710/307 |
| 7,461,195 B1 * | 12/2008 | Woodral | ............. | G06F 13/4291 710/104 |
| 7,660,925 B2 * | 2/2010 | Larson | .................. | G06F 13/372 710/104 |

(Continued)

FOREIGN PATENT DOCUMENTS

WO        2015/108522 A1        7/2015

OTHER PUBLICATIONS

Solomon, "Using CCIX to implement cache coherent heterogeneous multiprocessor systems," Synopsys, Jul. 18, 2017 (Year: 2017).*

(Continued)

*Primary Examiner* — Tim T Vo
*Assistant Examiner* — Phong H Dang
(74) *Attorney, Agent, or Firm* — Polansky & Associates, P.L.L.C.; Paul J. Polansky

(57) ABSTRACT

An interconnect controller includes a data link layer controller coupled to a transaction layer, wherein the data link layer controller selectively receives data packets from and sends data packets to the transaction layer, and a physical layer controller coupled to the data link layer controller and to a communication link. The physical layer controller selectively operates at a first predetermined link speed. The physical layer controller has an enhanced speed mode, wherein in response to performing a link initialization, the interconnect controller queries a data processing platform to determine whether the enhanced speed mode is permitted, performs at least one setup operation to select an enhanced speed, wherein the enhanced speed is greater than the first predetermined link speed, and subsequently operates the communication link using the enhanced speed.

38 Claims, 9 Drawing Sheets

(56) References Cited

U.S. PATENT DOCUMENTS

| | | | |
|---|---|---|---|
| 9,825,730 B1 | 11/2017 | Berke et al. | |
| 2004/0221056 A1* | 11/2004 | Kobayashi | H04L 5/1415 |
| | | | 709/232 |
| 2013/0332634 A1 | 12/2013 | Glaser | |
| 2014/0181355 A1* | 6/2014 | Barbiero | G06F 13/4022 |
| | | | 710/316 |
| 2014/0327477 A1* | 11/2014 | Chiang | H03L 7/08 |
| | | | 327/156 |
| 2018/0173666 A1 | 6/2018 | Srivastava | |
| 2018/0253398 A1 | 9/2018 | Wu et al. | |
| 2018/0331864 A1* | 11/2018 | Das Sharma | H04L 27/01 |
| 2019/0042281 A1* | 2/2019 | Raghav | G06F 9/44505 |

OTHER PUBLICATIONS

Esteve, "CCIX Protocol Push PCI Express 4.0 up to 25G," Synopsys, Jun. 8, 2017 (Year: 2017).*

"PCI Express® Base Specification-Revision 3.0"; White Paper; PCI-SIG; 3855 SW 153rd Drive, Beaverton, OR 97003; United States; Nov. 10, 2010; 860 pages.

International Search Report; International Application No. PCT/US2019/39505; dated Oct. 17, 2019; 3 pages.

Written Opinion of the International Searching Authority; International Application No. PCT/US2019/39505; dated Oct. 17, 2019; 5 pages.

* cited by examiner

FIG. 8
FIG. 9
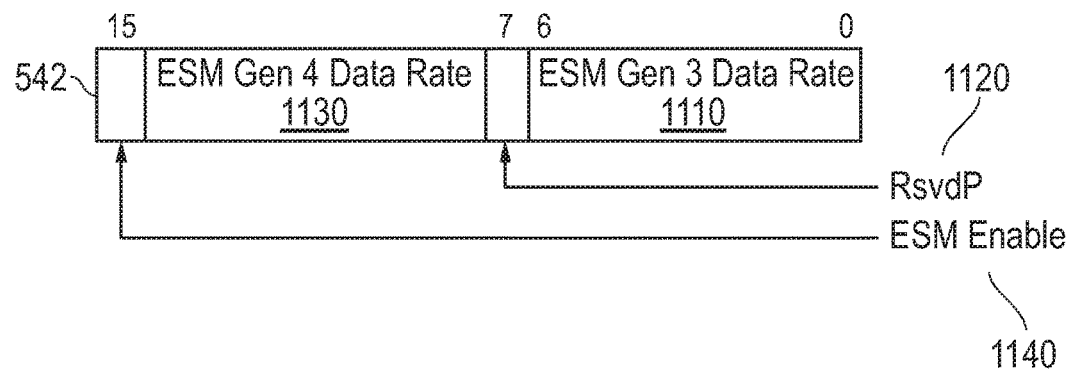
FIG. 10
FIG. 11

DATA COMMUNICATIONS WITH ENHANCED SPEED MODE

BACKGROUND

Data communications systems are conventionally designed to adhere to published communications standards so components of one manufacturer can interoperate with components from different manufacturers. For example, many modern computing devices make use of input/output (I/O) adapters and buses that utilize some version or implementation of the Peripheral Component Interconnect (PCI) or PCI Express (PCIe) interconnect standards. The PCIe standard specifies a computer communication interconnect for attaching peripheral devices to a host computer. PCIe is an extension of the earlier PCI standard that uses existing PCI programming concepts, but bases the computer interconnect on a faster physical-layer communications protocol. The PCIe physical layer consists of dual uni-directional links between upstream and downstream devices.

The PCIe standard is published by the Peripheral Component Interconnect Special Interest Group (PCI-SIG). The PCI-SIG revises the standard from time to time to reflect enhanced speed and capabilities. For example, PCIe 1.0 was published in 2003 and specified a transfer rate of 2.5 giga transfers per second (GT/s). PCIe 2.0 was introduced in 2007 and provided a 5.0 GT/s transfer rate, and was followed by PCIe 3.0 in 2010 with a 8.0 GT/s transfer rate, and PCIe 4.0 in 2017 with a 16.0 GT/s transfer rate. Thus the standard has increased the transfer rate in large, discrete steps with new versions that are published in 3-7 year cycles.

At the same time, semiconductor manufacturing technology has advanced rapidly. Advances such as deep sub-micron photolithography and low voltage complementary metal-oxide-semiconductor (CMOS) transistors have advanced processing speeds, making it difficult for standards-setting bodies such as the PCI-SIG to keep pace.

BRIEF DESCRIPTION OF THE DRAWINGS

FIG. 8 illustrates the PCIe ESM Header 1 of the extended capability descriptor of FIG. 5;

FIG. 9 illustrates the PCIe ESM Header 2 of the extended capability descriptor of FIG. 5;

FIG. 10 illustrates the ESM Status Register of the extended capability descriptor of FIG. 5;

FIG. 11 illustrates the ESM Control Register of the extended capability descriptor of FIG. 5;

Figure 1:
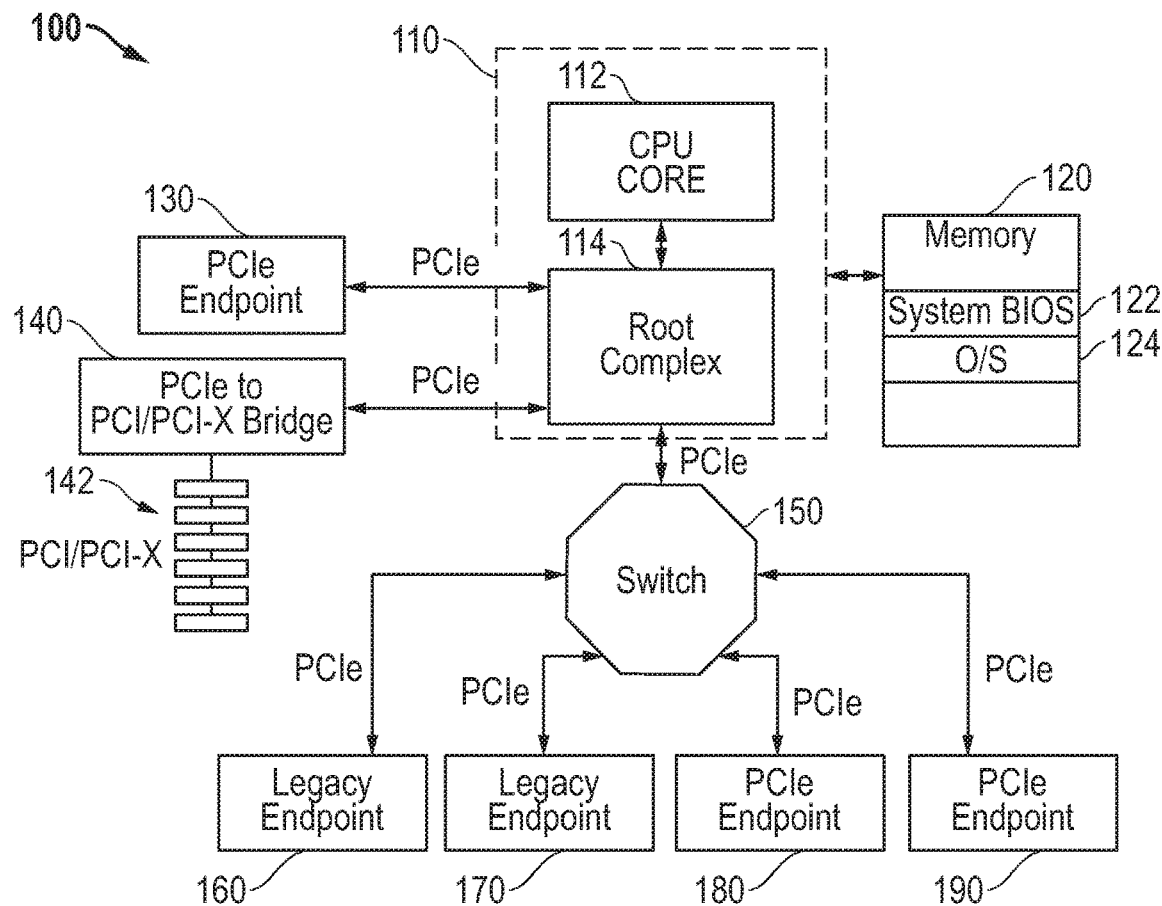
FIG. 1 illustrates in block diagram form an exemplary data processing platform using peripheral component interface (PCIe) links known in the prior art.

In the following description, the use of the same reference numbers in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

An interconnect controller for a data processing platform includes a data link layer controller and a physical layer controller. The data link layer controller is coupled to a transaction layer, wherein the data link layer controller selectively receives data packets from and sends data packets to the transaction layer. The physical layer controller is coupled to the data link layer controller and is coupled to a communication link. The physical layer controller selectively operates at a first predetermined link speed specified by a published standard. The physical layer controller has an enhanced speed mode, wherein in response to performing a link initialization, the interconnect controller queries the data processing platform to determine whether the enhanced speed mode is permitted, performs at least one setup operation to select an enhanced speed, wherein the enhanced speed is greater than the first predetermined link speed and is not specified by the published standard, and subsequently operates the communication link using the enhanced speed.

A data processing platform includes a basic input/output system (BIOS) and a data processor. The data processor includes a central processing unit and a Peripheral Component Interconnect Express (PCIe) root complex. The central processing unit is coupled to and is responsive to the BIOS to execute an initialization procedure. The PCIe root complex is coupled to the central processing unit and includes a first PCIe port controller that is coupled to a PCIe network. The first PCIe port controller supports a first predetermined link speed specified by a published standard and an enhanced speed mode. The BIOS includes instructions that when executed by the central processing unit cause the PCIe root complex to query the data processing platform to determine whether the enhanced speed mode is permitted, perform at least one setup operation to select an enhanced speed, wherein the enhanced speed is greater than the first predetermined link speed and is not specified by the published standard, and subsequently operate a communication link to the PCIe network using the enhanced speed.

A method for use in a data processing platform having an interconnect controller that operates a communication link according to a published standard includes querying the data processing platform to determine whether an enhanced speed mode is permitted. At least one setup operation is performed to select an enhanced speed, wherein the enhanced speed is not specified by the published standard and is greater than a first predetermined link speed specified by the published standard. The communication link is subsequently operated using the enhanced speed.

FIG. 1 illustrates in block diagram form an exemplary data processing platform 100 using peripheral component interface (PCI) Express (PCIe) links. Data processing platform 100 includes generally a central processing unit (CPU) 110, a memory 120, a PCIe endpoint 130, a PCI/PCIe bridge 140, a switch 150, legacy endpoints 160 and 170, and PCIe endpoints 180 and 190.

CPU 110 includes several components including a CPU core 112, a root complex 114, and several other components not relevant to the present disclosure and that are omitted from FIG. 1 for ease of discussion. CPU core 112 is functionally connected to root complex 114 through, for example, a cache and an internal data fabric. Root complex 114 is bidirectionally connected to several PCIe links, including a PCIe link to a PCIe endpoint 130, a PCIe link to a PCI/PCIe bridge 140, and a PCIe link to a switch 150. As shown in FIG. 1, PCI/PCIe bridge 140 in turn is connected to a hierarchy of PCI or PCIe devices 142, and switch 150 is connected legacy endpoints 160 and 170 and PCIe endpoints 180 and 190.

CPU 110 is also bidirectionally connected to memory 120. While FIG. 1 depicts memory 120 as a single memory system, it typically includes different types of memory that are connected to different sub-components of CPU 110. For example, a first portion of memory 120 stores a system basic input/output system (BIOS) 122, and is typically implemented as a non-volatile memory and connected to CPU 110 through a system controller or "Southbridge". On the other hand, a second portion of memory 120 stores an operating system 124. The operating system is typically stored on a mass storage medium such as a hard disk drive, and then loaded into faster, volatile random access memory (RAM) at boot up.

In operation, system BIOS 122 is used to boot up and initialize data processing platform 100. As part of the initialization, system BIOS 122 determines the input/output (I/O) devices present in data processing platform 100, and continues through a process of configuring the PCIe fabric known as enumeration. System BIOS 122 reads configuration registers associated with each I/O device present in the system to determine their respective characteristics and capabilities. Once system BIOS 122 finishes enumerating the system, initializing root complex 114, and performing various other startup tasks, it transfers control to operating system 124, which forms the environment in which application programs are run.

Over the years, the PCIe standard has changed as the capabilities of integrated circuit technology have advanced to allow new and faster speeds and enhanced capabilities. However, the standards setting process is relatively slow, lagging behind improvements in the capabilities of integrated circuit fabrication technology. Thus, PCI and PCIe systems have not been able to adapt seamlessly to take advantage of advances in integrated circuit technology.

Figure 2:
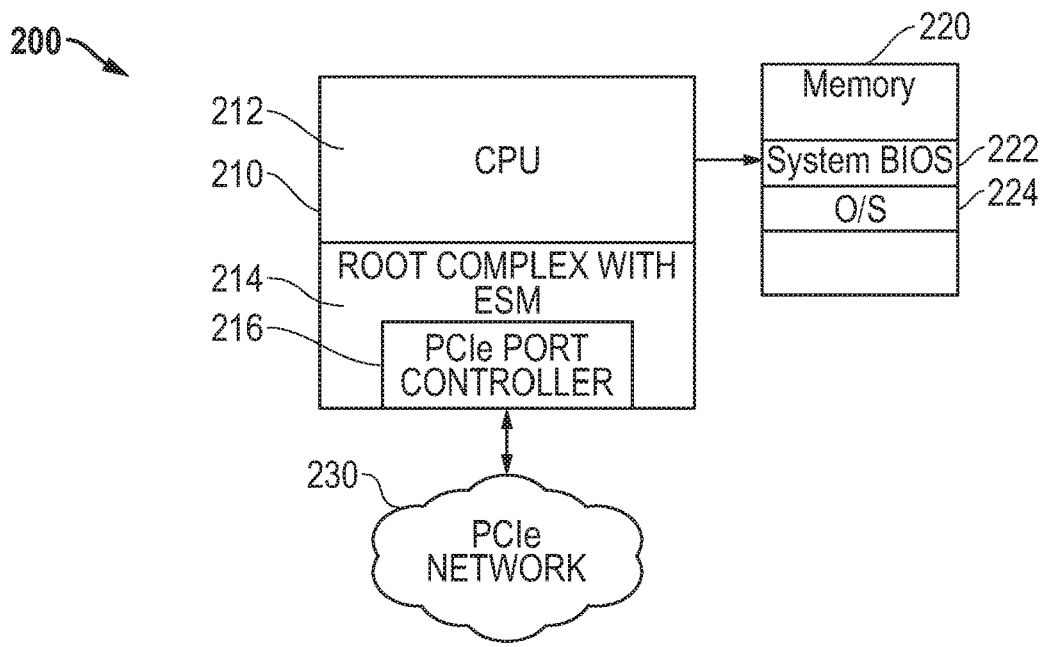
FIG. 2 illustrates in block diagram form a portion of a data processing platform using PCIe links with enhanced speed mode (ESM) according to some embodiments.

FIG. 2 illustrates in block diagram form a portion of a data processing platform 200 using PCIe links with enhanced speed mode (ESM) according to some embodiments. Data processing platform includes generally a CPU 210, a memory 220, and a PCIe network 230. CPU 210 includes a CPU core 212, a root complex 214, and several other components not relevant to the present discussion that are omitted from FIG. 2 for ease of discussion. As shown in FIG. 2, root complex 214 includes a PCIe port controller 216 but may include other PCIe port controllers. PCIe port controller 216 is bidirectionally connected to PCIe network 230. FIG. 2 shows PCIe network 230 as a cloud to highlight the fact that upon startup, the system configuration is unknown and must be learned through the discovery process and interconnected components assigned system addresses through enumeration. As in FIG. 1, CPU 210 is also bidirectionally connected to memory 220, and memory 220 has a first portion 222 that stores a system BIOS, and a second portion 224 that stores an operating system.

Data processing platform 200 differs from data processing platform 100 of FIG. 1 in that it supports enhanced speed mode (ESM). ESM extends the link speed specified by the PCIe standard as it has been revised from time to time. In particular, ESM allows higher and/or different speeds from the standard speeds specified in the various PCIe standard versions. Operation of the link at these enhanced speeds is permitted as long as the link partner in PCIe network 230 also supports ESM at the same speed. The enhanced speeds can take either of two forms. First, the enhanced speeds can be higher than the highest supported speed published in the standard. Second, the enhanced speeds can be between two discrete speeds specified by the standard.

The speeds supported by different generations of published PCIe standards are shown in TABLE I below:

TABLE I

|  | Raw Bit Rate | Link Bandwidth | BW/Lane/Way (approx.) | Total BW × 16 (approx.) |
| --- | --- | --- | --- | --- |
| PCIe 1.x | 2.5 GT/s | 2 GB/s | 250 MB/s | 8 GB/s |
| PCIe 2.x | 5 GT/s | 4 GB/s | 500 MB/s | 16 GB/s |
| PCIe 3.0 | 8 GT/s | 8 GB/s | 1 GB/s | 32 GB/s |
| PCIe 4.0 | 16 GT/s | 16 GB/s | 2 GB/s | 64 GB/s |

In one example of an implementation of ESM, an enhanced speed can be a speed between the 8.0 GT/s speed specified by the published PCIe 2.0 standard and the 16.0 GT/s speed specified by the published PCIe 3.0 standard. In another example, the enhanced speed can be any of a number of discrete speeds between 8.0 GT/s and 16.0 GT/s. In yet another example, the enhanced speed can be a single discrete speed higher than 16.0 GT/s specified by the published PCIe 3.0 standard, such as 25.0 GT/s. In still another example, the enhanced speed can be any of a number of discrete speeds between 16.0 GT/s and 25.0 GT/s.

By supporting speeds above the published PCIe speeds, data processing platform 200 allows the performance of the data processing platform to be improved on PCIe links where both link partners support the same enhanced speed capabilities. The speed can be set, for example, to the highest speed supported by both link partners. Thus, ESM allows scalable performance improvements that are not limited by the discrete speeds specified by the standards, but only by the capabilities of the semiconductor manufacturing processes used by the upstream and downstream ports and the controllers associated with them.

Figure 3:
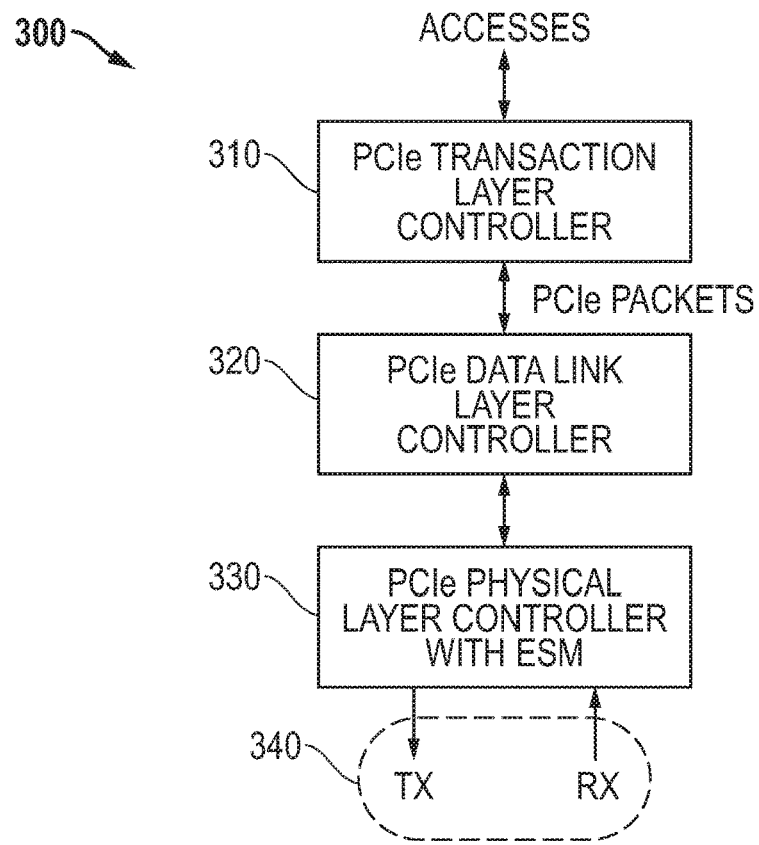
FIG. 3 illustrates in block diagram form an interconnect controller with enhanced speed mode suitable for use in the data processing platform of FIG. 2 according to some embodiments.

FIG. 3 illustrates in block diagram form an interconnect controller 300 with enhanced speed mode suitable for use in data processing platform 200 of FIG. 2 according to some embodiments. Interconnect controller 300 includes a PCIe transaction layer controller 310, a PCIe data link layer controller 320, and a PCIe physical layer controller 330.

PCIe transaction layer controller 310 has an upstream bidirectional connection for receiving data accesses and providing data responses, collectively labeled "ACCESSES" in FIG. 3, and a downstream bidirectional connection for providing and receiving PCIe packets. The system BIOS also provides various ACCESSES for querying downstream system components and enumerating the system. The data accesses include memory reads, memory writes received from a data accessing agent, and responses including read data responses returned from a PCIe endpoint and completions. PCIe transaction layer controller 310 translates the memory access requests into PCIe packets and vice versa. Thus it abstracts the interconnect protocol from the memory accessing agents, i.e. it provides protocol invisibility to the memory accessing agents.

PCIe data link layer controller 320 has a bidirectional upstream port connected to the downstream port of PCIe transaction layer controller 310, and a bidirectional downstream port. It performs link setup, packet sequencing, flow control, retry, and other features normally associated with a data link layer according the open systems interconnect (OSI) model. PCIe data link layer controller 320 adds headers, control information, frame check sequences, and the like to form a data link layer packet that it provides to PCIe physical layer controller 330 for access requests, and processes the headers, control information, and frame check sequences of data link layer packets received from PCIe physical layer controller 330 to form PCIe packets for access responses.

PCIe physical layer controller 330 has an upstream bidirectional port connected to the downstream bidirectional port of PCIe data link layer controller 320, and a downstream port connected to a medium 340 that includes a unidirectional transmit port labeled "TX" and a unidirectional receive port labeled "RX". PCIe physical layer controller 330 supports one or more enhanced speeds as will be described further below.

In the exemplary embodiment, PCIe transaction layer controller 310, PCIe data link layer controller 320, and PCIe physical layer controller 330 are all circuit blocks on a CPU chip. However the blocks of interconnect controller 300 can be implemented with various combinations of hardware and software (e.g. operating system drivers). For example, PCIe physical layer controller 330 can implemented in hardware and PCIe transaction layer controller 310 can be implemented in software, while PCIe data link layer controller 320 can be implemented partially in hardware and partially in software.

Figure 4:
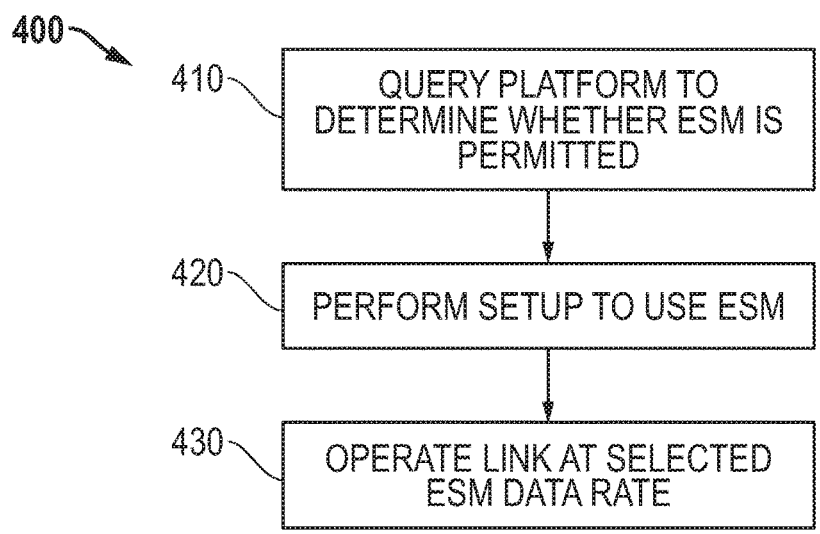
FIG. 4 illustrates a flow diagram of a link initialization setup performed by the interconnect controller of FIG. 3 according to some embodiments.

FIG. 4 illustrates a flow diagram 400 of a link initialization setup performed by interconnect controller 300 of FIG. 3 according to some embodiments. Upon initialization, interconnect controller 300 initializes the link to which it is connected using action boxes 410, 420, and 430 in sequence.

In action box 410, the system BIOS controls interconnect controller 300 to query data processing platform 200 to determine whether ESM is permitted. Querying the platform involves enumerating the bus hierarchy structure to detect that the platform is of the type that permits ESM to be used. This permission involves first determining that the platform is enabled for ESM operation, and second that a port exists at the other end of the link to which interconnect controller 300 is connected that is capable of ESM operation.

In action box 420, the system BIOS controls interconnect controller 300 to perform a setup procedure to use ESM. Once it is determined that ESM will be run, one or the other, both, or neither of the components may require some setup before actually running in ESM. Interconnect controller 300 begins the setup phase of the process in response to software, such as the system BIOS, writing its configuration registers to enable ESM in both the upstream port (USP) and downstream port (DSP). For an ESM-aware port, the setup may be when an "ESM Enable" bit of an ESM Control register is written with a "1". For a non-ESM aware Port, a vendor specific initiator register may be used. The initiator register in the DSP must be written prior to the initiator in the USP, since writing the register in the USP also initiates a transition to link state L1 and an electrical idle (EI) bus state as defined in the PCIe standard.

Writing the initiator register triggers the following sequence. First, interconnect controller 300 sets a variable that causes it to perform the setup necessary to prepare for entering the ESM, on the next occurrence only of the port's transmitters going to the EI state, and its receivers detecting an EIOS, or detecting or inferring EI, while the Link is in the LinkUp state. Second, for an ESM-aware USP, the link controller is directed to initiate an entry to the L1 state. A non-ESM aware USP will be put into the $D3_{hot}$ state to cause it to transition to the software directed L1 link state. Third, interconnect controller 300 performs required environmental changes, e.g., changing the voltage, recalibrating the physical layer controllers (PHYs) and other hardware, and the like.

Subsequently, each and every time that the initiator bit is written with a "1", this sequence is triggered and interconnect controller 300 performs the setup. The setup is only performed on the first transition to the EI state following the writing of the initiator register, and all subsequent EI occurrences behave normally and do not trigger this setup procedure.

In action box 430, interconnect controller 300 operates the link at the selected ESM data rate. Thus the link is able to achieve performance beyond the performance specified in the published standard, limited only by the capabilities of the process technology used for the circuitry at both ends of the link but not by the arbitrary speed definitions necessitated by the process of publishing a technical standard by a standards setting organization like the PCI-SIG.

Exemplary PCIe Implementation

Details of an implementation of ESM in PCIe will now be explained with reference to a specific example.

Figure 5:
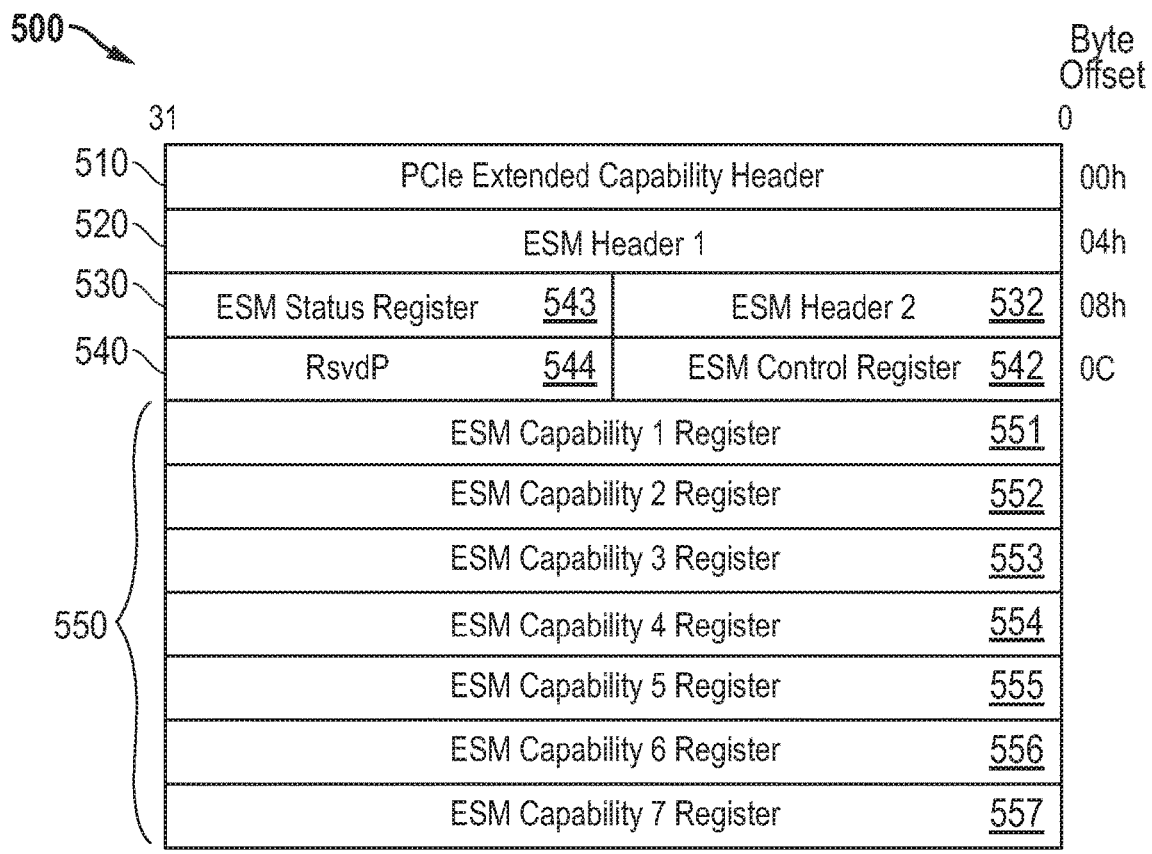
FIG. 5 illustrates an enhanced capability descriptor of the interconnect controller of FIG. 3 according to some embodiments.

FIG. 5 illustrates an extended capability descriptor 500 of the interconnect controller of FIG. 3 according to some embodiments. Extended capability descriptor 500 is known as a Designated Vendor Specific Extended Capability and includes a set of eleven 32-bit words containing configuration information, including a 32-bit PCIe Extended Capability Header 510, a 32-bit ESM Header 1 520, a 32-bit word 530 including a 16-bit ESM Header 2 and a 16-bit ESM Status Register 534, a 32-bit word 540 including a 16-bit ESM Control Register 542 and a 16-bit reserved field labeled "RsvdP" 544, and a set of ESM capability registers 550. ESM capability registers 550 include an ESM Capability 1 Register 551, an ESM Capability 2 Register 552, an ESM Capability 3 Register 553, an ESM Capability 4 Register 554, an ESM Capability 5 Register 555, an ESM Capability 6 Register 556, and an ESM Capability 7 Register 557. Extended capability descriptor 500 is stored in PCIe configuration space and is accessed by system BIOS during discovery and enumeration and defines the supported capabilities of interconnect controller 300. The bits used in the various registers will now be described.

Figure 6:
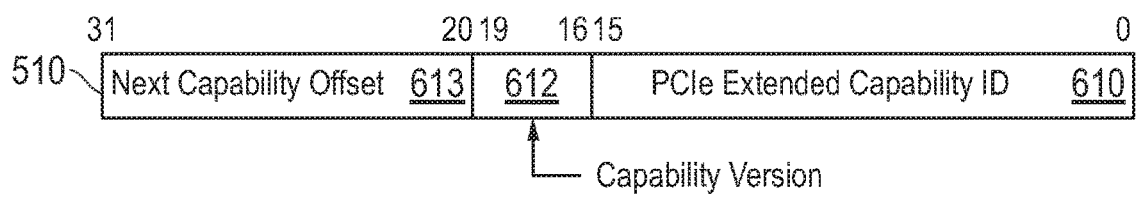
FIG. 6 illustrates the PCIe Extended Capability Header of the extended capability descriptor of FIG. 5.

FIG. 6 illustrates PCIe Extended Capability Header 510 of extended capability descriptor 500 of FIG. 5. PCIe Extended Capability Header 510 includes a PCIe Extended Capability ID field 610 in bits 0-15, a Capability Version 612 in bits 16-19, and a Next Capability Offset field 613 in bits

20-31. PCIe Extended Capability ID field 610 is a read-only (RO) field in bits 0-15 that stores an identification number that indicates the nature and format of the extended capability, and is defined by the PCIe SIG. Capability Version 612 is an RO field in bits 16-19 that stores a version number defined by the PCI SIG that indicates the version of the capability structure present. The Next Capability Offset field 620 is an RO field in bits 20-31 that stores either an offset to the next PCI Express Capability structure, or 000h if no other items exist in the linked list of Capabilities. For Extended Capabilities implemented in the PCIe Configuration Space, this offset will be relative to the beginning of the PCI-compatible Configuration Space, and thus must always be either 000h (for terminating the list of Capabilities), or an offset greater than 0FFh. How the BIOS uses Next Capability Offset 613 will now be described.

Figure 7:
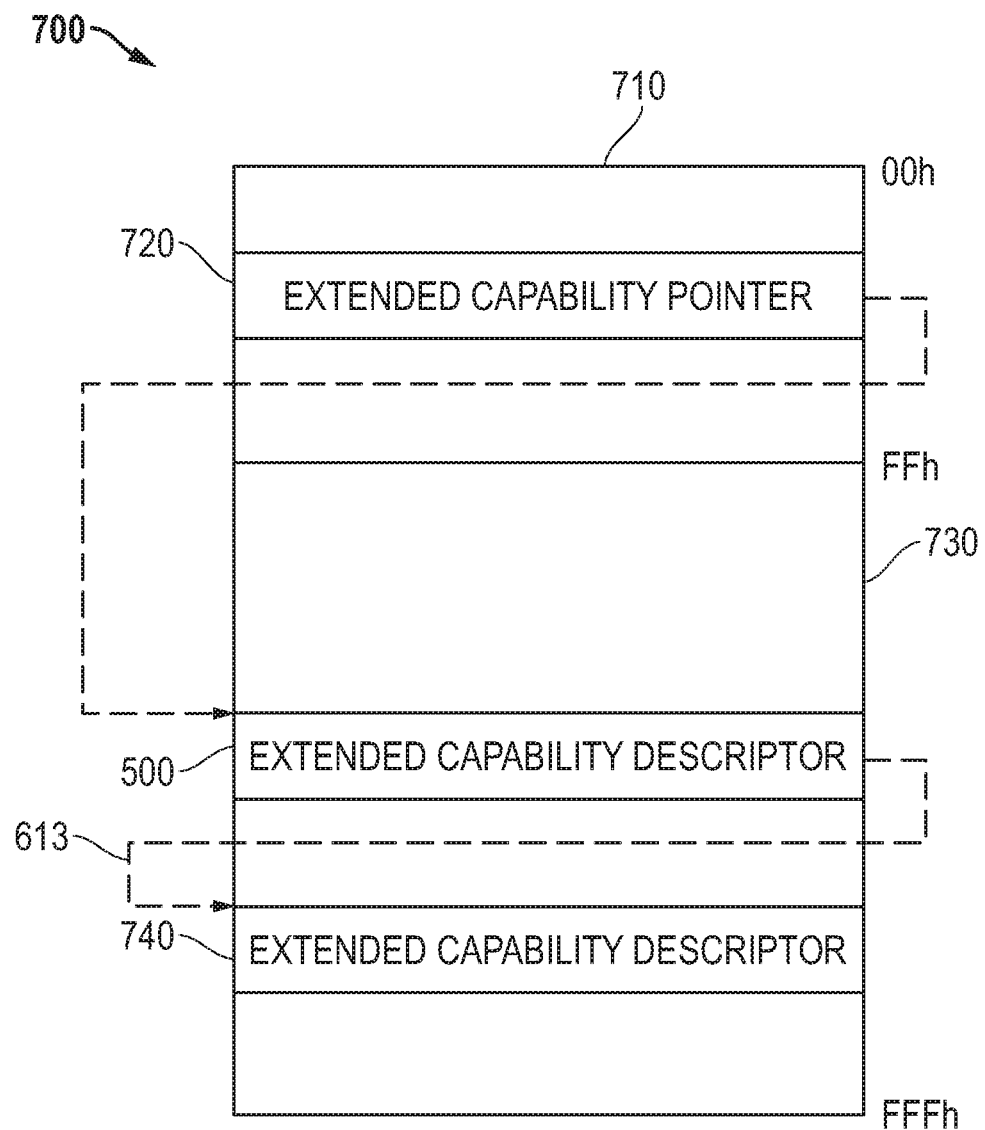
FIG. 7 illustrates an address map showing how the PCIe root complex of FIG. 2 locates a subsequent Extended Capability Descriptor using the current Extended Capability Descriptor.

FIG. 7 illustrates an address map 700 showing how root complex 214 of FIG. 2 uses the Next Capability Pointer to locate a subsequent Extended Capability Descriptor. Address map 700 includes a base address 710 forming the beginning of the PCI-compatible Configuration Space at offset 00h. An address location 720 between base address 710 and FFh stores the location of Extended Capability Descriptor 500. The firmware in BIOS accesses the information in Extended Capability Descriptor 500. After accessing relevant information in it, the system BIOS reads the Next Capability Offset in bits 20-31 of PCIe extended capability descriptor 500 at offset 00h from the base address of Extended Capability Descriptor 500. If this value is equal to 000h, the system BIOS knows that this is the last Extended Capability Descriptor in the port's configuration space. If the value is not equal to 000h but is greater than FFh, then the system BIOS uses this as an offset from base address 710 to find the next Extended Capability Descriptor 740.

FIG. 8 illustrates PCIe ESM Header 1 520 of extended capability descriptor 500 of FIG. 5. PCIe ESM Header 1 520 includes an ESM Vendor ID field 810 in bits 0-15, an ESM Capability Revision 820 in bits 16-19, and an ESM Capability Length 830 in bits 20-31. ESM Vendor ID field 810 is populated with a unique number corresponding to the vendor that defined the extended capability structure.

ESM Capability Revision 820 is a version number that indicates the version of the extended capability. The system BIOS qualifies both the ESM Vendor ID and the ESM Capability ID (see below) before interpreting this field. ESM Capability Length 830 indicates the number of bytes in the entire extended capability data structure, including the PCI Express Extended Capability header, the ESM Header, and the ESM registers.

FIG. 9 illustrates the PCIe ESM Header 2 532 of extended capability descriptor 500 of FIG. 5. ESM Header 2 includes a single field in bits 0-15 storing the ESM Capability ID. This field is the vendor-defined ID number that indicates the nature and format of the Designated Vendor Specific Extended Capability (DVSEC) structure. The system BIOS must qualify ESM Vendor ID field 810 before interpreting this field.

FIG. 10 illustrates the ESM Status Register 534 of extended capability descriptor 500 of FIG. 5. ESM Status Register 534 occupies the upper 16 bits of word 530 of extended capability descriptor 500 and includes a Minimum Time in EI Value 1010 in bits 0-8, a Minimum Time in EI Scale 1020 in bits 9-11, and a reserved field in bits 12-15. Minimum Time in EI Value 1010 and Minimum Time in EI Scale 1020 together define the minimum time in the EI state, which is equal to the Minimum Time in EI Value multiplied by a multiplier corresponding to the bit value in the Minimum Time in EI Scale. For example, the Minimum Time in EI Scale can have a value of 0 to indicate a multiplier of 1 nanosecond (ns), a value of 1 to indicate a multiplier of 32 ns, a value of 2 to indicate a multiplier of 1,024 ns, a value of 3 to indicate a multiplier of 32,768 ns, a value of 4 to indicate a multiplier of 1,045,576 ns, and a value of 5 to indicate a multiplier of 33,554432 ns. Values of 6 and 7 are reserved. However it should be apparent that these are just examples.

FIG. 11 illustrates the ESM Control Register 542 of extended capability descriptor 500 of FIG. 5. ESM Control Register 542 includes an ESM "Gen 3" Data Rate field 1110 in bits 0-6, a reserved field 1120 in bit 7, an ESM Generation "Gen 4" Data Rate field 1130 in bits 8-14, and an ESM Enable bit in bit 15. As used herein, Gen 3 corresponds to PCIe 8.0 GT/s data rates and Gen 4 corresponds to PCIe 16.0 GT/s data rates. ESM Gen 3 Data Rate field 1110 is the data rate in GT/s that the interface runs when speed changes negotiate to the Gen 3 data rate and the Link is enabled in ESM. In one example, the speed equals (64+the value in this field)*100×10$^6$. For example, 12.8 GT/s=a value of 64. When the ESM Enable bit is set, speed changes to Gen 3 use ESM at the data rate defined by this field. When the ESM Enable bit is Clear, speed changes to Gen 3 use the normal (non-ESM) values and run at the normal (8.0 GT/s) data rate. ESM Gen 4 Data Rate field 1130 is a read-write field that indicates the data rate in GT/s that the interface runs when speed changes negotiate to the Gen 4 data rate and the Link is enabled in ESM. The speed equals (128+the value in this field)*100×10$^6$. For example, 20.8 GT/s=a value of 80. When the ESM Enable bit is set, speed changes to Gen 4 use ESM at the data rate defined by this field. When the ESM Enable bit is clear, speed changes to Gen 4 use the normal (non-ESM) values and run at the normal (16.0 GT/s) data rate. If the Port does not support Gen 4, this field can be hardwired to 000 0000b. ESM Enable bit 1140 is a read/write bit that enables ESM. The default value of this bit is "0", and writing a "1" to this bit triggers the ESM initialization sequence shown in FIG. 4 and described above.

Figure 12:
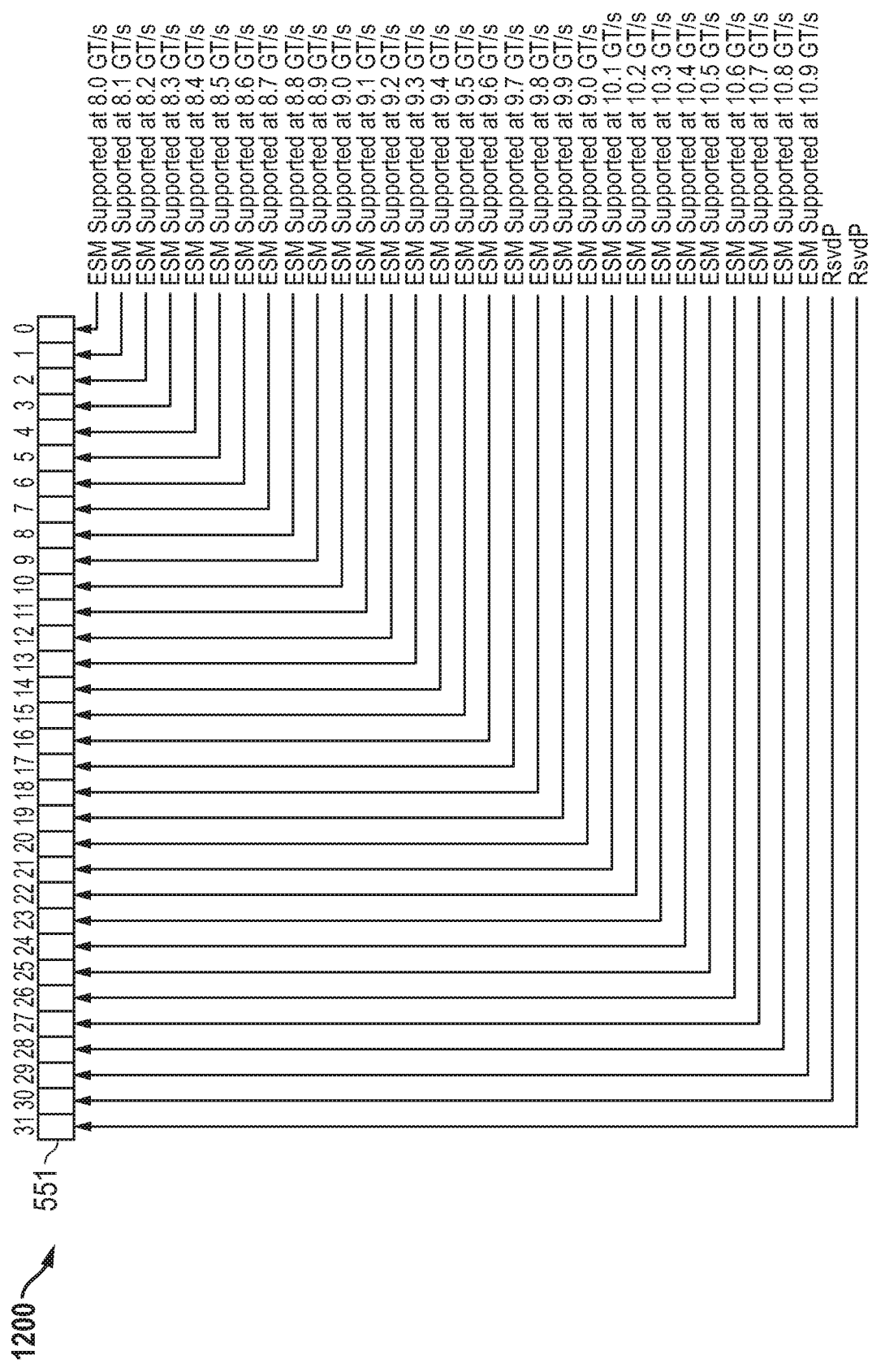
FIG. 12 illustrates the ESM Capability 1 Register of the extended capability descriptor of FIG. 5.

FIG. 12 illustrates the ESM Capability 1 Register 551 of extended capability descriptor 500 of FIG. 5. ESM Capability 1 Register 551 is a 32-bit register having thirty active bits in bit positions 0-29 and two reserved bits in bits positions 30 and 31. In the exemplary embodiment, root complex 214 is capable of generating PCIe clock signals in increments corresponding to transfer rates of 100 MT/s. For example, root complex 214 includes a phase locked loop (PLL) having a programmable loop divider capable of generating an output PCIe clock signal with frequencies starting at the PCIe generation 3.0 rate of 8.0 GHz and higher frequencies starting at 8.1 GT/s in bit position 1, 8.2 GT/s in bit position 2, and so on until it reaches 10.9 GT/s in bit position 29. ESM Capability 1 Register 551 is a read-only capabilities register; thus a "0" in a corresponding bit position indicates that ESM at that speed is not supported, whereas a "1" in a corresponding bit position indicates that ESM at that speed is supported. Note that ESM Capability 1 Register 551 is not a one-hot register; all supported speeds are indicated with a "1" in the corresponding bit position. ESM Capability 2 Registers 552-ESM Capability 7 Register 557 contain corresponding mappings of bits.

Figure 13:
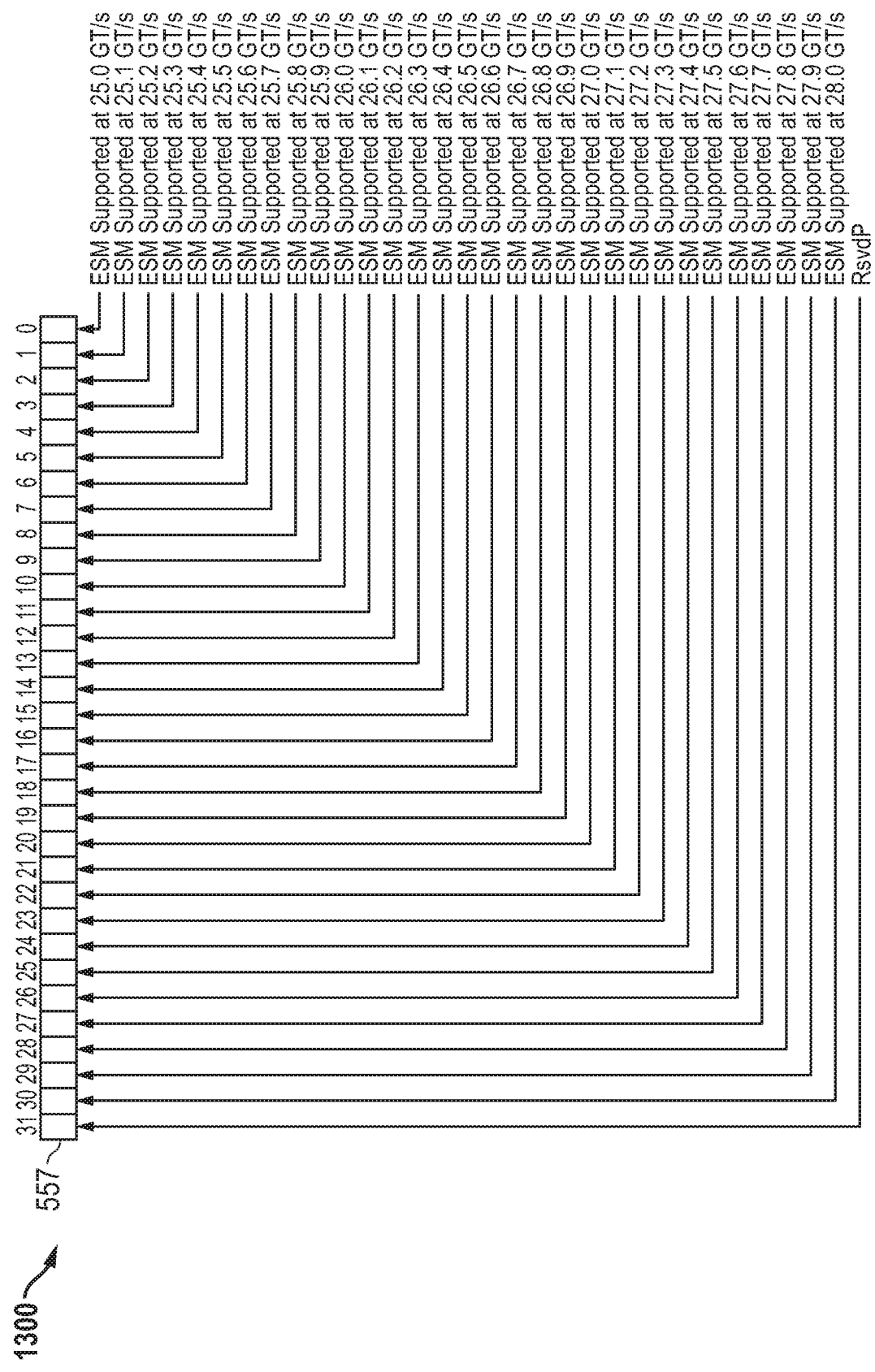
FIG. 13 illustrates the ESM Capability 7 Register of the extended capability descriptor of FIG. 5.

FIG. 13 illustrates ESM Capability 7 Register 557 of the extended capability descriptor 500 of FIG. 5. ESM Capability 7 Register 557 is a 32-bit register having thirty-one active bits in bit positions 0-30 and one reserved bit in bit position 31. ESM Capability 7 Register 557 indicates support for frequencies between 25.0 GT/S and 28.0 GT/s starting at 25.0 GT/s in bit position 0, 25.1 GT/s in bit position 2, and so on until it reaches 28.0 GT/s in bit position 30. ESM Capability 7 Register 557 is a read-only capabilities register; thus a "0" in a corresponding bit position indicates that ESM at that speed is not supported, whereas a "1" in a corresponding bit position indicates that ESM at that speed is supported. As in ESM Capability 1 Register 551, ESM Capability 7 Register 557 shows all supported speeds with a "1" in the corresponding bit position.

Although not shown, ESM Capability 2 Register 552, ESM Capability 3 Register 553, ESM Capability 4 Register 554, ESM Capability 5 Register 555, and ESM Capability 6 Register 556 have generally corresponding bit assignments as ESM Capability 1 Register 551. ESM Capability 2 Register 552 indicates support for transfer rates between 11.0 GT/2 and 13.9 GT/s in 100 MT/s increments. ESM Capability 3 Register 553 indicates support for transfer rates between 14.0 GT/2 and 15.9 GT/s in 100 MT/s increments, and unlike the other registers, has reserved bits in bit positions 20-31. ESM Capability 4 Register 554 indicates support for transfer rates between 16.0 GT/2 and 18.9 GT/s in 100 MT/s increments. ESM Capability 5 Register 555 indicates support for transfer rates between 19.0 GT/2 and 21.9 GT/s in 100 MT/s increments. ESM Capability 6 Register 556 indicates support for transfer rates between 22.0 GT/2 and 24.9 GT/s in 100 MT/s increments.

During discovery and enumeration, root complex 214 discovers the existence and capabilities of all PCIe devices in data processing platform 200 by examining the registers in PCIe configuration space, and determining a speed of operation between each pair of link partners. Root complex 214 first determines whether extended speed mode is supported, and if it is, further examines the ESM capability descriptor of each device and port between the root complex and the endpoint. Generally, the determined speed will be the highest supported speed in common with the link controller in root complex 214 and all PCI links to the endpoints in the tree.

Figure 14:
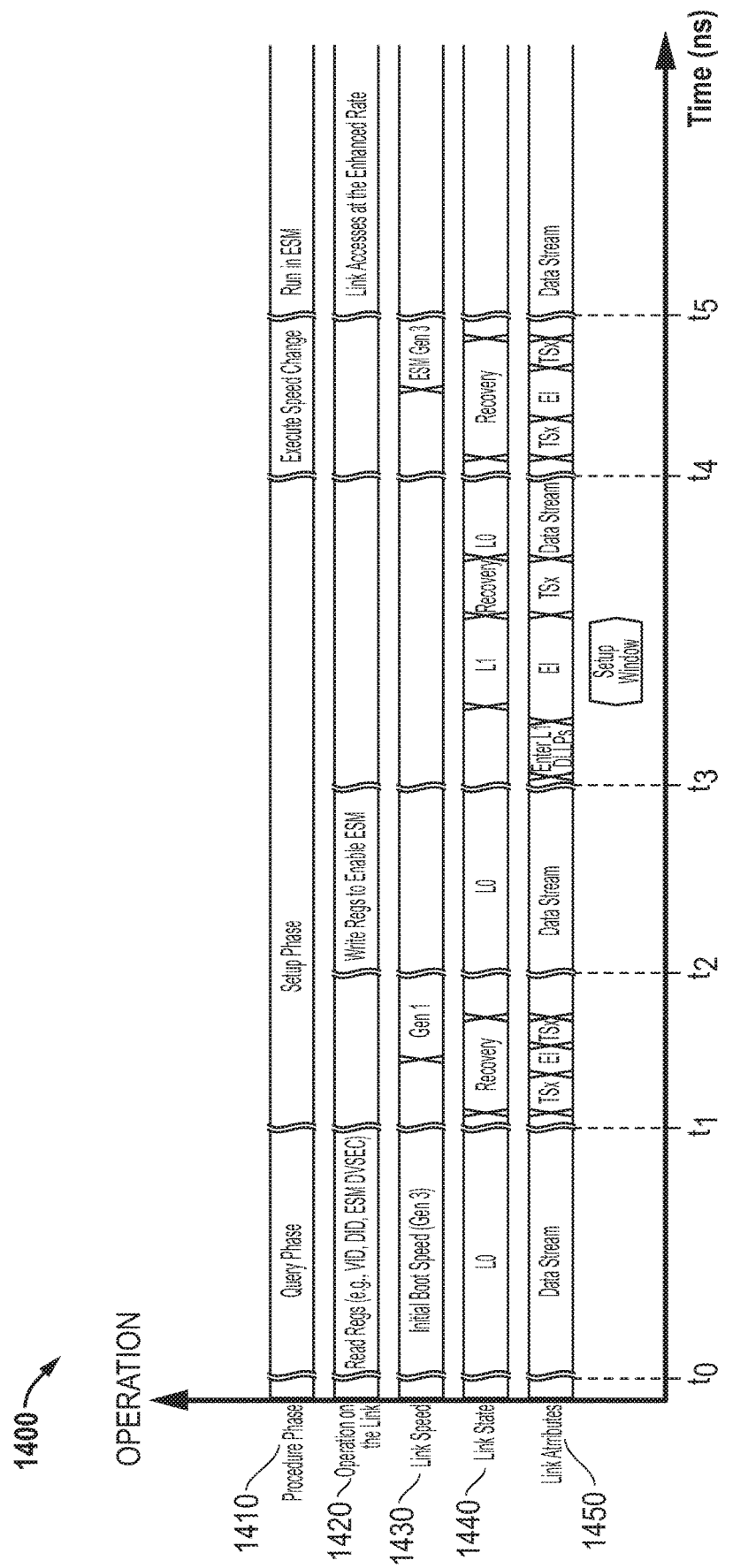
FIG. 14 illustrates a timing diagram showing the initialization of the interconnect controller of FIG. 3.

FIG. 14 illustrates a timing diagram 1400 showing the initialization of the interconnect controller 300 of FIG. 3. In timing diagram 1400, the horizontal axis represents time in nanoseconds (ns), and the vertical axis represents various parameters related to link operation. Along the horizontal axis, timing diagram 1400 shows six time points of interest labeled "t0", "t1", "t2", "t3", "t4", and "t5". Along the vertical axis, timing diagram 1400 shows five parameters of interest including a first link state 1410 labeled "Procedure Phase", a second link state 1420 labeled "Operation on the Link", a third link state 1430 labeled "Link Speed", a fourth link state 1440 labeled "Link State", a fifth link state 1450 labeled "Link Attributes".

Between $t_0$ and $t_1$, the Procedure Phase is in the query phase. During this time the link is being used to read the registers in the PCIe configuration space, including the vendor ID (VID), device ID (DID), and the ESM Developer Designated Vendor Specific Extended Capability identified in extended capability descriptor 500. Moreover, the speed is set to the initial boot speed for Gen 3, namely 8.0 GT/s. The Link State is in the L0 (fully on) state, and the Link Attributes are Data Stream.

Between $t_1$ and $t_4$, the Procedure Phase is in the setup phase. Between $t_1$ and $t_2$, there is no data transfer operation on the link. The speed changes to the Gen 1 (2.5 GT/s) link speed, and the Link State enters the Recovery state before transitioning back to the L0 at the new Link Speed. During this time, the link transmits training sets labeled "TSx" separated by an EI condition. Between $t_2$ and $t_3$, root complex 314 writes to registers, e.g. ESM Control Register 542, to enable ESM on all supported links. The Link Speed remains in Gen 1, and the Link State in L0. The Link Attributes are Data Stream. Between $t_3$ and $t_4$, the Link State changes from L0 to L1 and Recovery before returning to L0. The Link Attributes are L1 DLLPs, followed by EI, followed by training set TSx, followed by a Data Stream.

Between $t_4$ and $t_5$, the Procedure Phase is to Execute the Speed Change according to the highest commonly supported speed by all DSPs and USPs on a supported link. The Link Speed is changed to the selected ESM link speed, which can be different than the Gen 3 link speed. The link enters the Recovery link state before returning to the L0 state. The link transmits training sets TSx interrupted by the EI state during the speed change, before transmitting further training sets TSx at the new ESM link speed.

Following the end of training occurring at $t_5$, the link operates in ESM, and performs data accesses in the L0 link state at the enhanced rate. Once the necessary setup has been completed and the link is back in the L0, any subsequent speed changes that negotiate to the Gen 3 or Gen 4 data rates will run at the ESM data rate programmed into the ESM Control register. Any speed changes that negotiate to the Gen 1 or Gen 2 data rates will run at their 'normal' data rates (2.5 GT/s for Gen 1, 5.0 GT/s for Gen 2).

Figure 15:
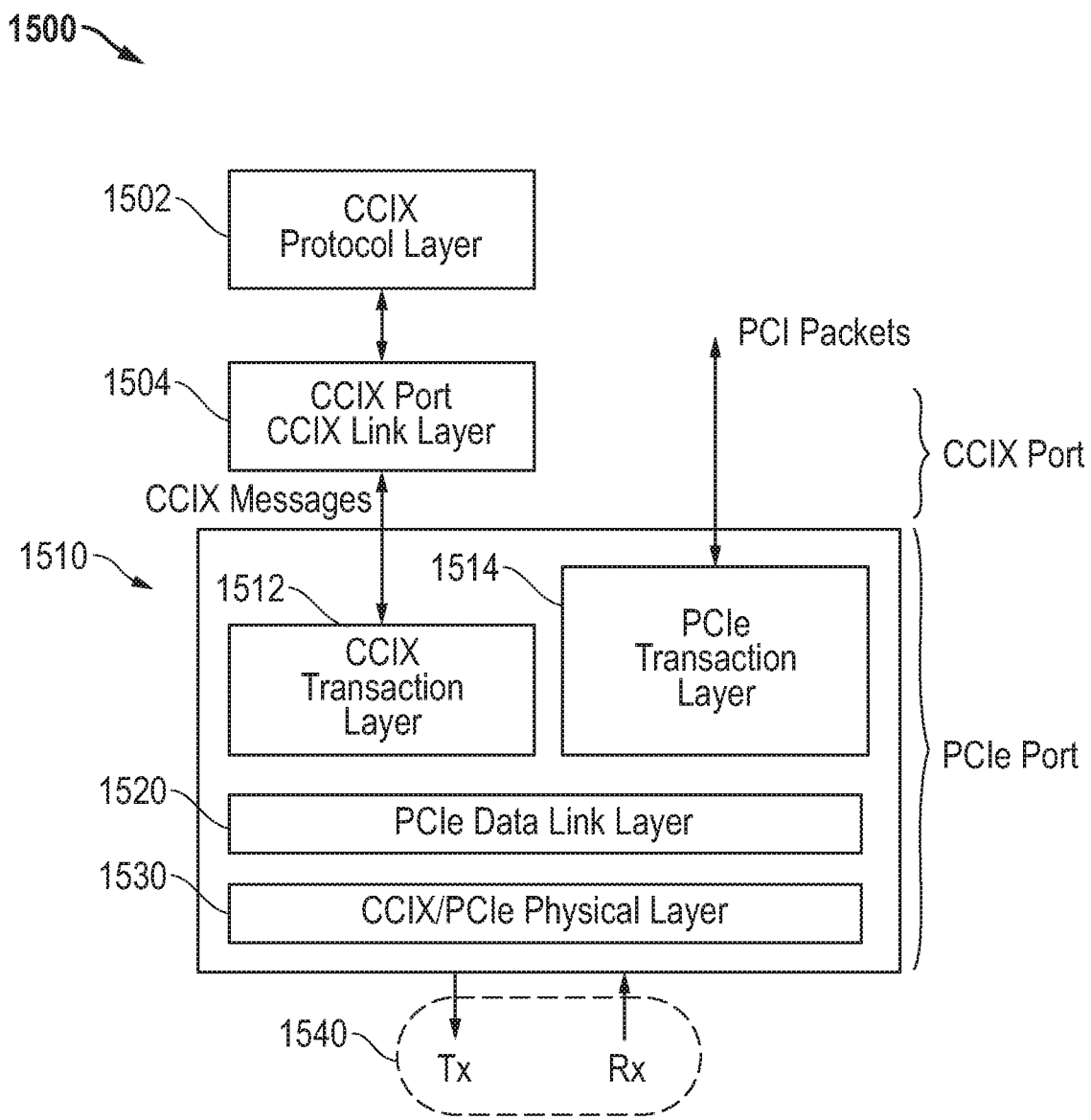
FIG. 15 illustrates in block diagram form a communication controller that supports either a PCIe transaction layer or a CCIX transaction layer according to some embodiments.

FIG. 15 illustrates in block diagram form a communication controller 1500 that supports either a PCIe transaction layer or a Cache Coherent Interconnect for Accelerators (CCIX) transaction layer according to some embodiments. Communications controller 1500 includes generally a CCIX protocol layer block 1502, a CCIX port with CCIX link layer block 1504, and a PCIe port 1510.

CCIX protocol layer block 1502 is responsible for the coherency protocol, including memory read and write flows. Cache states defined in this layer allow the determination of the state of the memory, for example whether the data is unique and clean or if it is shared and dirty. CCIX protocol layer block 1502 is bidirectionally connected to CCIX port with CCIX link layer block 1504. The CCIX Protocol Layer is responsible for formatting CCIX traffic and forming and decoding CCIX.

PCIe port 1510 includes a CCIX transaction layer block 1512, a PCIe transaction layer block 1514, a PCIe data link layer block 1520, and a CCIX/PCIe physical layer block 1530. CCIX transaction layer block 1512 is responsible for handling CCIX packets, while PCIe transaction layer block 1514 is responsible for handling PCIe packets. PCIe port 1510 supports virtual channels to allow different data streams to travel across a single PCIe link. By splitting CCIX traffic into one virtual channel and PCIe traffic into a second virtual channel, PCIe port 1510 allows both CCIX and PCIe traffic to share the same PCIe medium 1540. PCIe data link layer block 1520 performs all of the normal functions of the data link layer, including CRC error checking, packet acknowledgment and timeout checking, and credit initialization and exchange. CCIX/PCIe physical layer block 1530 is built on a standard PCIe physical layer. CCIX extends PCIe to support a 25 GT/s ESM (Extended Speed Mode), which extends beyond the 16.0 GT/s speed first introduced in the PCI Express 4.0 standard. In addition, it supports extended speeds between the PCI Express 4.0 standard speed (16 GT/s) and a higher speed (such as 25 GT/s). Thus it supports greater granularity and a more robust migration path to higher speeds.

Thus, the interconnect controller disclosed herein provides a robust controller that provides a seamless upgrade path to higher performance without the necessity of waiting for periodic revisions to a published standard. The higher performance can take one of two forms. First, it can extend beyond a highest data transfer rate and/or highest clock speed yet specified by the standard, avoiding the need for corresponding communication components to be developed after a new revision of a standard has been published. Second, it adds intermediate data transfer rates and/or clock speeds that can be supported by the semiconductor manufacturing technology without making a whole step to a next published rate. The interconnect controller and data processors incorporating such an interconnect controller leverages advances in semiconductor manufacturing technology that may lead development of published standards, and allow enhanced performance without the constraints of large, discrete speed steps. The techniques are useful in a variety of data communication protocols, including PCIe and CCIX (that operates using PCIe data link and physical layers).

PCIe port controller 216 and CPU 210 or any portions thereof may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, various high-frequency oscillators can be used for the reference oscillator in a time-to-digital converter. These include a CMOS ring oscillator, a series-resonant LC oscillator, a parallel-resonant LC oscillator, and an RC oscillator. Moreover various current controlled oscillator circuits can be used. In current controlled oscillator circuits that are based on a resistor, the resistor can take various forms such as a polysilicon resistor, a thin-film metal alloy resistor, and a thin-film metal mixture resistor. Moreover the divider can use a variety of fixed numbers for the numerator.

Accordingly, it is intended by the appended claims to cover all modifications of the disclosed embodiments that fall within the scope of the disclosed embodiments.

What is claimed is:

1. An interconnect controller for a data processing platform comprising:
    a data link layer controller adapted to be coupled to a transaction layer; and
    a physical layer controller coupled to said data link layer controller and adapted to be coupled to a communication link and having an enhanced speed mode,
    wherein in response to performing a link initialization, the interconnect controller performs at least one setup operation to select an enhanced speed, wherein said enhanced speed is between a first predetermined link speed and a second predetermined link speed,
    wherein said physical layer controller supports a plurality of link speeds between said first predetermined link speed and said second predetermined link speed,
    wherein said first and second predetermined link speeds are specified by published standards, and said enhanced speed is a selected one of said plurality of link speeds that are not specified by said published standards, wherein successive ones of said plurality of link speeds are separated from each other by the same predetermined amount,
    wherein the interconnect controller determines said enhanced speed by accessing at least one enhanced speed mode capability register, and
    wherein the interconnect controller is part of a data processing platform that programs a programmable loop divider of a phase locked loop according to said enhanced speed.

2. The interconnect controller of claim 1, wherein:
said first and second predetermined link speeds are Peripheral Component Interconnect Express (PCIe) Base Specification link speeds.

3. The interconnect controller of claim 2, wherein:
the interconnect controller is part of a PCIe root complex that determines said enhanced speed for the interconnect controller based on capabilities of an upstream port of an endpoint.

4. The interconnect controller of claim 3, wherein:
said PCIe root complex determines said enhanced speed for the interconnect controller as a highest mutually supported speed by the interconnect controller and said upstream port of said endpoint.

5. The interconnect controller of claim 3, wherein:
said PCIe root complex determines said enhanced speed for the interconnect controller by accessing a PCIe configuration space.

6. The interconnect controller of claim 5, wherein:
the interconnect controller determines said enhanced speed by accessing an extended capability descriptor in said PCIe configuration space.

7. The interconnect controller of claim 1, wherein:
said first predetermined link speed is a highest published speed supported by said published standards.

8. The interconnect controller of claim 1, wherein:
said transaction layer comprises a PCIe transaction layer.

9. The interconnect controller of claim 1, wherein:
said transaction layer comprises a cache coherent interconnect for accelerators (CCIX) transaction layer.

10. The interconnect controller of claim 1, wherein:
the same predetermined amount comprises 100 MT/s.

11. The interconnect controller of claim 1, further comprising:
    a phase locked loop having a programmable loop divider for generating a clock signal to cause the physical layer controller to operate at a selected one of said plurality of link speeds.

12. The interconnect controller of claim 1, wherein each of said at least one enhanced speed mode capability register includes a plurality of bits each corresponding to a link speed, wherein when a bit is in a first logic state, it indicates that a corresponding link speed is supported, and when a bit is in a second logic state, it indicates that said corresponding link speed is not supported.

13. A data processing platform comprising:
a basic input/output system (BIOS); and
a data processor comprising a central processing unit and a Peripheral Component Interface Express (PCIe) root complex coupled to said central processing unit and comprising a first PCIe port controller that is adapted to be coupled to a PCIe network, wherein said first PCIe port controller supports a first predetermined link speed and a second predetermined link speed, and has an enhanced speed mode,
wherein said BIOS comprises instructions that when executed by said central processing unit cause said PCIe root complex to select an enhanced speed between said first predetermined link speed and a second predetermined link speed, and subsequently operate a communication link to the PCIe network using said enhanced speed,
wherein said first PCIe port controller supports a plurality of link speeds between said first predetermined link speed and said second predetermined link speed,
wherein said first and second predetermined link speeds are specified by published standards, and said enhanced speed is a selected one of said plurality of link speeds that are not specified by said published standards, wherein successive ones of said plurality of link speeds are separated from each other by the same predetermined amount, and
wherein the data processing platform further comprises a phase locked loop having a programmable loop divider for generating a clock signal to cause said first PCIe port controller to operate at a selected one of said plurality of link speeds, wherein said BIOS further comprises instructions that when executed by said central processing unit cause said PCIe root complex to:
query at least one enhanced speed mode capability register to select said enhanced speed according to bits in said at least one enhanced speed mode capability register; and
program said programmable loop divider of said according to said enhanced speed.

14. The data processing platform of claim 13, wherein:
said first predetermined link speed is a highest published speed supported by said published standards.

15. The data processing platform of claim 13, wherein:
said PCIe root complex determines said enhanced speed for said first PCIe port controller based on capabilities of a downstream port.

16. The data processing platform of claim 13, wherein:
said PCIe root complex determines said enhanced speed for said first PCIe port controller as a highest mutually supported speed between said first PCIe port controller and a downstream port.

17. The data processing platform of claim 13, wherein:
said PCIe root complex determines said enhanced speed for said first PCIe port controller by accessing a PCIe configuration space.

18. The data processing platform of claim 17, wherein:
said PCIe root complex determines said enhanced speed for said first PCIe port controller by accessing an extended capability descriptor in said PCIe configuration space.

19. The data processing platform of claim 13, wherein:
the same predetermined amount comprises 100 MT/s.

20. The data processing platform of claim 13, wherein said PCIe root complex comprises:
a phase locked loop having a programmable loop divider for generating a clock signal to cause said first PCIe port controller to operate at a selected one of said plurality of link speeds.

21. The data processing platform of claim 13, wherein said BIOS further comprises instructions that when executed by said central processing unit cause said PCIe root complex to:
access at least one enhanced speed mode capability register of said PCIe root complex and at least one PCIe device to determine a highest supported speed in common with said PCIe root complex and said at least one PCIe device; and
select said highest supported speed as said enhanced speed.

22. The data processing platform of claim 13, wherein said BIOS further comprises instructions that when executed by said central processing unit cause said PCIe root complex to:
determine a highest supported speed by a link partner; and
select said enhanced speed as a highest speed supported by both the data processing platform and said link partner.

23. The data processing platform of claim 13, wherein each of said at least one enhanced speed mode capability register includes a plurality of bits each corresponding to a link speed, wherein when a bit is in a first logic state, it indicates that a corresponding link speed is supported, and when a bit is in a second logic state, it indicates that said corresponding link speed is not supported.

24. A method for use in a data processing platform having an interconnect controller that operates a communication link according to published standards, comprising:
querying the data processing platform to determine whether an enhanced speed mode is permitted;
performing at least one setup operation to select an enhanced speed, wherein the enhanced speed is a selected one of a plurality of link speeds and is not specified by the published standards and is between a first predetermined link speed and a second predetermined link speed specified by the published standards, wherein successive ones of said plurality of link speeds are separated from each other by the same predetermined amount; and
subsequently operating the communication link using said enhanced speed; and
determining said enhanced speed mode for the interconnect controller in response to accessing at least one enhanced speed mode capability register,
wherein subsequently operating the communication link using said enhanced speed mode comprises programming a programmable divider of a phase locked loop in response to the contents of said at least one enhanced speed mode capability register.

25. The method of claim 24, wherein:
said first and second predetermined link speeds are Peripheral Component Interconnect Express (PCIe) Base Specification link speeds.

26. The method of claim 24, further comprising:
determining said enhanced speed for the interconnect controller as a highest mutually supported speed between the interconnect controller and an upstream port.

27. The method of claim 24, wherein:
determining said enhanced speed mode for the interconnect controller in response to accessing said at least one enhanced speed mode capability register comprises determining a state of a plurality of bits each corresponding to a link speed, wherein when a bit is in a first logic state, it indicates that a corresponding link speed is supported, and when said bit is in a second logic state, it indicates that said corresponding link speed is not supported.

28. The method of claim 24, further comprising:
determining said enhanced speed for the interconnect controller as a highest mutually supported speed between the interconnect controller and an upstream port.

29. The method of claim 24, wherein:
said first and second predetermined link speeds are Peripheral Component Interconnect Express (PCIe) Base Specification link speeds; and
determining said enhanced speed mode for the interconnect controller in response to accessing said at least one enhanced speed mode capability register comprises accessing said at least one enhanced speed mode capability register in PCIe configuration space onto select said enhanced speed.

30. An interconnect controller for a data processing platform comprising:
a data link layer controller adapted to be coupled to a transaction layer; and
a physical layer controller coupled to said data link layer controller and adapted to be coupled to a communication link, said physical layer controller selectively operating at a predetermined link speed specified by published standards, wherein the physical layer controller has an enhanced speed mode,
wherein in response to performing a link initialization, the interconnect controller:
performs at least one setup operation to select an enhanced speed, wherein said enhanced speed is a selected one of a plurality of link speeds greater than said predetermined link speed; and
subsequently operates the communication link using said enhanced speed, wherein:
said predetermined link speed is specified by published standards and is a highest link speed specified by said published standards, and said plurality of link speeds greater than said predetermined link speed are not specified by said published standards, and successive ones of said plurality of link speeds greater than said predetermined link speed are separated from each other by the same predetermined amount,
the interconnect controller determines said enhanced speed by accessing at least one enhanced speed mode capability register; and
the interconnect controller is part of a data processing platform that programs a programmable loop divider of a phase locked loop according to said enhanced speed.

31. The interconnect controller of claim 30, wherein:
the same predetermined amount comprises 100 MT/s.

32. The interconnect controller of claim 30, wherein:
the interconnect controller performs the at least one setup operation to select said enhanced speed by programming a programmable loop divider of a phase locked loop.

33. The interconnect controller of claim 30, wherein the interconnect controller further:
accesses at least one enhanced speed mode capability register to select said enhanced speed.

34. The interconnect controller of claim 30, wherein each of said at least one said enhanced speed mode capability register includes a plurality of bits each corresponding to a link speed, wherein when a bit is in a first logic state, it indicates that a corresponding link speed is supported, and when a bit is in a second logic state, it indicates that said corresponding link speed is not supported.

35. An interconnect controller for a data processing platform comprising:
a data link layer controller adapted to be coupled to a transaction layer; and
a physical layer controller coupled to said data link layer controller and adapted to be coupled to a communication link that selectively operates at a first predetermined link speed specified by a published standard,
wherein the interconnect controller has an enhanced speed mode in which it operates at a selected enhanced link speed between said first predetermined link speed and a second predetermined link speed,
wherein said selected enhanced link speed is a selected one of a plurality of enhanced link speeds between said first predetermined link speed and said second predetermined link speed, wherein successive ones of said plurality of enhanced link speeds are separated from each other by the same predetermined amount,
wherein the interconnect controller determines said selected enhanced link speed by accessing at least one enhanced speed mode capability register, and
wherein the data processing platform programs a programmable loop divider of a phase locked loop according to said selected enhanced link speed selected in said enhanced speed mode.

36. The interconnect controller of claim 35, wherein:
said second predetermined link speed is specified by the published standard.

37. The interconnect controller of claim 35, wherein:
said first and second predetermined link speeds are Peripheral Component Interconnect Express (PCIe) Base Specification link speeds; and
the interconnect controller is part of a PCIe root complex that determines said selected enhanced link speed for the interconnect controller based on capabilities of an upstream port of an endpoint.

38. The interconnect controller of claim 37, wherein:
said PCIe root complex determines said selected enhanced link speed for the interconnect controller by accessing an extended capability descriptor in a PCIe configuration space.

* * * * *